(12) United States Patent
Read

(10) Patent No.: US 12,565,451 B2
(45) Date of Patent: Mar. 3, 2026

(54) MULTI-MANDREL BRAIDING PROCESS

(71) Applicant: RTX Corporation, Farmington, CT (US)

(72) Inventor: Kathryn S. Read, Marlborough, CT (US)

(73) Assignee: RTX Corporation, Farmington, CT (US)

( * ) Notice: Subject to any disclaimer, the term of this patent is extended or adjusted under 35 U.S.C. 154(b) by 226 days.

(21) Appl. No.: 18/236,261

(22) Filed: Aug. 21, 2023

(65) Prior Publication Data

US 2025/0066259 A1 Feb. 27, 2025

(51) Int. Cl.
| | |
|---|---|
| *B29C 65/00* | (2006.01) |
| *C04B 35/628* | (2006.01) |
| *C04B 35/80* | (2006.01) |
| *B29C 65/48* | (2006.01) |
| *B29C 65/52* | (2006.01) |
| *B29C 65/70* | (2006.01) |

(52) U.S. Cl.
CPC ........ *C04B 35/80* (2013.01); *C04B 35/62863* (2013.01); *C04B 35/62884* (2013.01); *B29C 65/48* (2013.01); *B29C 65/522* (2013.01); *B29C 65/70* (2013.01); *B29C 66/0344* (2013.01); *C04B 2235/3826* (2013.01); *C04B 2235/5244* (2013.01); *C04B 2235/5256* (2013.01); *C04B 2235/614* (2013.01)

(58) Field of Classification Search
CPC ....... B29C 65/48; B29C 65/522; B29C 65/70; B29C 66/0344; C04B 35/80
See application file for complete search history.

(56) References Cited

U.S. PATENT DOCUMENTS

| | | | |
|---|---|---|---|
| 5,576,079 | A | 11/1996 | Forman et al. |
| 6,843,462 | B2 | 1/2005 | Nakamura |
| 9,434,111 | B2 | 9/2016 | Mathon et al. |
| 9,689,265 | B2 | 6/2017 | De Diego |
| 11,104,032 | B2 | 8/2021 | White et al. |
| 11,396,814 | B2 | 7/2022 | Barker |

(Continued)

FOREIGN PATENT DOCUMENTS

| | | |
|---|---|---|
| JP | 2017110519 A | 6/2017 |

OTHER PUBLICATIONS

Partial European Search Report for EP Application No. 24195676.2, dated Jan. 20, 2025, 11 pages.

(Continued)

*Primary Examiner* — Philip C Tucker
*Assistant Examiner* — Nickolas R Harm
(74) *Attorney, Agent, or Firm* — Kinney & Lange, P.A.

(57) ABSTRACT

A system for forming multiple braided preform segments includes a mandrel assembly disposed along a mandrel axis, a radial braider for winding fibers onto the mandrel assembly to form a continuous braided article, an applicator for applying a polymer binder to the braided article while mounted on the mandrel assembly, and a debulking tool for debulking the braided article while mounted on the mandrel assembly. The mandrel assembly includes a lead-in extension defining a first end, an end extension defining a second end, and a plurality of mandrels removably connected to a plurality of transition pieces and disposed axially between the lead-in extension and the end extension.

20 Claims, 5 Drawing Sheets

(56) References Cited

U.S. PATENT DOCUMENTS

| | | | | |
|---|---|---|---|---|
| 11,608,748 | B2 | 3/2023 | Liles et al. | |
| 2001/0015510 | A1* | 8/2001 | Nakamura ............... | D04C 3/48 |
| | | | | 264/159 |
| 2010/0166568 | A1* | 7/2010 | Lin ......................... | B64C 27/12 |
| | | | | 264/269 |
| 2014/0027046 | A1* | 1/2014 | Mathon ................. | B29C 53/562 |
| | | | | 156/173 |
| 2016/0289873 | A1* | 10/2016 | Head ......................... | B32B 5/02 |
| 2019/0352999 | A1 | 11/2019 | Greenlee et al. | |
| 2020/0139643 | A1* | 5/2020 | Ogale ...................... | B29C 53/84 |
| 2021/0199013 | A1* | 7/2021 | Read ....................... | B32B 18/00 |
| 2024/0139998 | A1* | 5/2024 | Surace ................. | B29C 70/003 |

OTHER PUBLICATIONS

Extended European Search Report for EP Application No. 24195676.
2, dated May 15, 2025, 11 pages.

* cited by examiner

MULTI-MANDREL BRAIDING PROCESS

BACKGROUND

The present invention relates to ceramic matrix composites (CMCs) and, more particularly, to the manufacturing of fibrous ceramic preforms.

Braiding is one technique for preparing fibrous preforms which wraps/winds fibers onto a mandrel in a continuous manner, allowing for the formation of continuous, rather than disjointed final components with reduced mechanical properties. It also allows for customization of the amount of fiber reinforcement in the axial or circumferential directions based on the braiding parameters. Braiding can be, however, a costly means of producing preforms due to the amount of scrap (i.e., unusable) material generated, and the amount of manual intervention needed to carry out braiding, transition to post-processing steps (e.g., debulking). Thus, a more efficient means for producing a high volume of braided preforms is desirable.

SUMMARY

A system for forming multiple braided preform segments includes a mandrel assembly disposed along a mandrel axis, a radial braider for winding fibers onto the mandrel assembly to form a continuous braided article, an applicator for applying a polymer binder to the braided article while mounted on the mandrel assembly, and a debulking tool for debulking the braided article while mounted on the mandrel assembly. The mandrel assembly includes a lead-in extension defining a first end, an end extension defining a second end, and a plurality of mandrels removably connected to a plurality of transition pieces and disposed axially between the lead-in extension and the end extension.

A method of forming multiple CMC parts from a braided article includes assembling a mandrel assembly, the mandrel assembly including a lead-in extension, an end extension, and a plurality of mandrels removably connected to a plurality of transition pieces and disposed axially between the lead-in extension and the end extension. The method further includes incorporating the mandrel assembly into a braiding system, forming a continuous braided article over the plurality of mandrels and the plurality of transition pieces, cutting the braided article into a plurality of preform segments, forming a corresponding plurality of preforms from the plurality of preform segments, densifying the plurality of preforms with a ceramic matrix.

Figure 1:
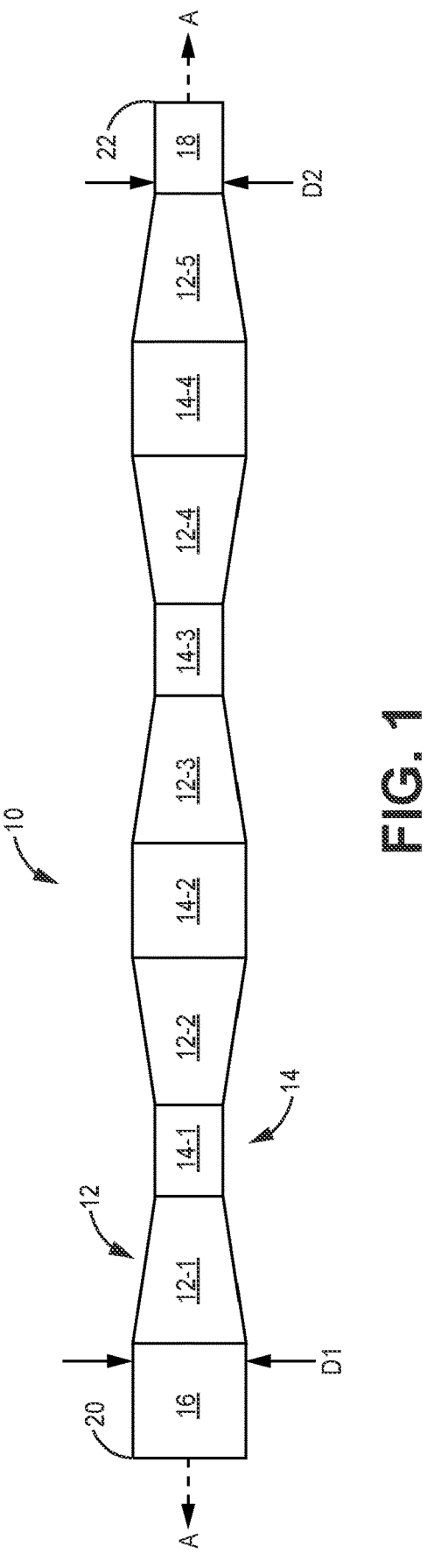
FIG. 1 is a simplified illustration of a multi-mandrel assembly for fabricating CMC articles.

While the above-identified figures set forth one or more embodiments of the present disclosure, other embodiments are also contemplated, as noted in the discussion. In all cases, this disclosure presents the invention by way of representation and not limitation. It should be understood that numerous other modifications and embodiments can be devised by those skilled in the art, which fall within the scope and spirit of the principles of the invention. The figures may not be drawn to scale, and applications and embodiments of the present invention may include features and components not specifically shown in the drawings.

DETAILED DESCRIPTION

This disclosure presents a multi-mandrel assembly for fabricating multiple CMC parts in a single braiding process. Fabrication of CMC parts may begin with forming a fibrous ceramic fabric into the geometry of the part to be produced (i.e., a preform). For hollow parts, ceramic (e.g., silicon carbide) fibers can be braided or woven around a mandrel to form a fiber preform. The geometry of the mandrel is analogous to the geometry of the part such that the fiber preform takes the shape of the part. Subsequently, one or more interface coatings are applied to the fiber preform, followed by densification with a ceramic matrix material (e.g., silicon carbide) via chemical vapor infiltration (CVI) to form the final or near final part. This fabrication process, however, can be time-consuming and wasteful of the ceramic fibers. For instance, there may be substantial set-up time of the machinery for each mandrel to apply the ceramic fibers. Moreover, there is a lead-in region to each mandrel where the braiding or weaving is started before the geometry of the article. The lead-in region is not part of the final article and is thus removed later on, thereby resulting ceramic fiber waste.

FIG. 1 is a simplified illustration of mandrel assembly 10 intended to overcome many of the aforementioned challenges. Mandrel assembly 10 can be formed by connecting individual mandrels 12-1 through 12-5 (collectively and/or generically referred to as "mandrels 12") in an end-to-end manner along axis A with intervening transition pieces 14-1 through 14-4 (collectively and/or generically referred to as "transition pieces 14"). Assembly 10 further includes lead-in extension 16 and end extension 18 at respective first and second ends 20 and 22 of mandrel assembly 10. The outer surface of mandrel assembly 10 transitions repeatedly between first dimension D1 and second, smaller dimension D2. As used herein, "dimension" can refer to a diameter, for more rounded pieces, or a length, for example, of a cross-sectional plane, along a perimeter, etc. Lead-in extension 16 and transition pieces 14-2 and 14-4 can have generally uniform dimensions in the axial direction equivalent to D1. End extension 18 and transition pieces 14-1 and 14-2 can also have uniform dimensions in the axial direction equivalent to D2. Each mandrel 12 can transition from D1 to D2 or vice versa. Each mandrel 12 can be physically in contact with a suitably sized transition piece 14 (including lead-in extension 16 and end extension 18). More specifically, mandrel 12-1 is in contact with and disposed axially between lead-in extension 16 and transition piece 14-1, mandrel 12-2 is in contact with and disposed axially between transition piece 14-1 and transition piece 14-2, mandrel 12-3 is in contact with and disposed axially between transition piece 14-2 and transition piece 14-3, mandrel 12-4 is in contact with and disposed axially between transition piece 14-3 and transition piece 14-4, and mandrel 12-5 is in contact with and disposed axially between transition piece 14-4 and end extension 18. Mandrels 12 are oriented such that they transition axially from tapering to widening in a repeated manner from one mandrel (e.g., mandrel 12-1) to the next (e.g., mandrel 12-2). In an alternative embodiment, mandrel assembly 10 can be oppositely disposed about axis A, that is, with end extension 18 of FIG. 1 in the lead-in position and lead-in extension 16 of FIG. 1 in the terminal/end position. In such an embodiment, the first mandrel would widen from the lead-in position to the first transition piece, rather than taper, as shown in FIG. 1.

Figure 2:
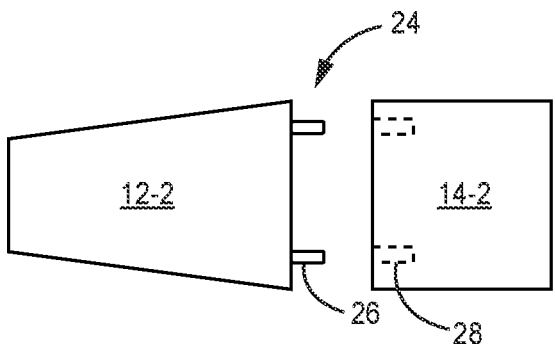
FIG. 2 is a simplified exploded view of a mandrel and a transition piece of the multi-mandrel assembly of FIG. 1 illustrating the connection means used to attach one to the other.

Mandrels 12 can be removably attached to corresponding transition pieces 14, lead-in extension 16, and/or end extension 18 using connection means, such as tangs, clips, or male/female connectors, including threaded fasteners and pin-slot arrangements. FIG. 2 is a simplified exploded view of mandrel 12-2 and transition piece 14-2 showing one example of connection means 24 as pins 26 on mandrel 12-2 configured to mate with corresponding slots 28 (represented in dashed lines) on transition piece 14-2. Mandrel assembly 10 can be assembled by connecting first mandrel 12-1 to lead-in extension 16, followed by transition piece 14-1 and so on, until the desired number of mandrels 12 are included. The attachment of end extension 18 completes mandrel assembly 10.

Mandrels 12, transition pieces 14, lead-in extension 16 and/or end extension 18, inclusive of connection means 24, can be formed from graphite, metal, or 3D printed/injection molded plastic. In an exemplary embodiment, mandrels 12 can be made from metal or graphite, and remaining sections made from plastic. Metallic and graphite mandrels 12 are better suited to retain braided parts for subsequent processing (e.g., debulking, chemical vapor infiltration), while the remaining components, which do not always perform well being exposed to chemicals or elevated pressures and temperatures, can be less expensively produced from plastic. In another embodiment, mandrel assembly 10 can be entirely formed from a single material. For example, mandrel assembly 10 can be formed from plastic with each mandrel 12 being 3D printed to the desired dimensions of a CMC part.

Figure 3:
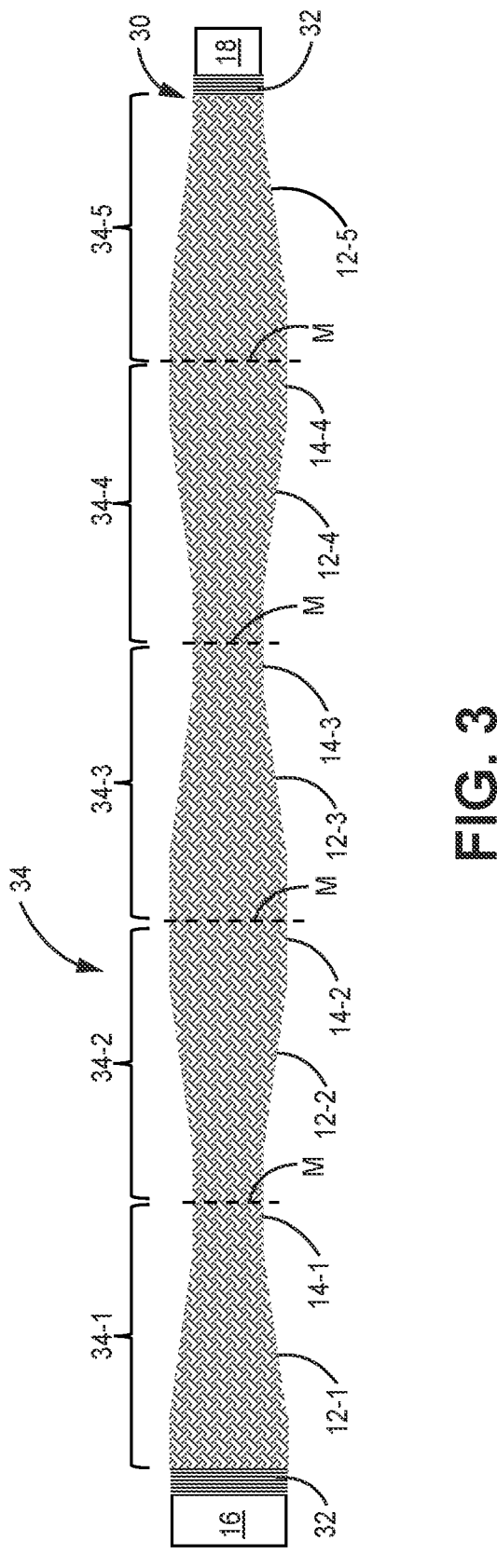
FIG. 3 is a simplified illustration of a braided article covering the multi-mandrel assembly of FIG. 1

FIG. 3 is a simplified illustration of braided article 30, continuously formed over mandrel assembly 10. The braiding process can begin with braiding ceramic fibers onto lead-in extension 16. These initial fibers can be secured in place using tape 32 to facilitate further braiding, which progresses axially along mandrel assembly 10. In an alternative embodiment, tape 32 can instead be another suitable means for securing ceramic fibers to lead in extension 16, such as clamps or glue. The tension of fibers on the braider can be adjusted to allow braided article 30 to conform to the repeated tapering and widening caused by the arrangement of mandrels 12 and transition pieces 14. Tape 32 (or clamps, glue, etc.) can be applied to the final fibers braided over end extension 18 such that both ends of braided article 30 are secured to mandrel assembly 10 for subsequent processing. One such processing step includes the cutting of braided article 30 into multiple preform segments (collectively and/or generically referred to as "preform segments 34"), each of which can be subsequently shaped into a preform and densified to form a CMC part. More specifically, mandrel assembly 10 is configured to produce five preform segments 34-1 through 34-5. Cutting can occur on transition pieces 14, and more specifically, generally at an axial midpoint M of each transition piece 14, represented in FIG. 3 by dashed lines. As such, each preform segment 34 includes braided fabric from a portion (i.e., half) of two separate transition pieces 14 (including lead-in extension 16 and end extension 18), one with dimension D1 and the other with dimension D2, and a whole mandrel. Each preform segment 34 can be completely separated from adjacent preform segment(s) 34 after cutting. Tape 32 and any adhered fibers are also cut and separated from the adjacent preform segment 34. By comparison, fabricating five such preform segments 34 using an individual mandrel for each (i.e. using conventional methods) would generate five times the fabric waste from tape 32 and increase processing time due to the need to install and remove each mandrel.

Figure 4:
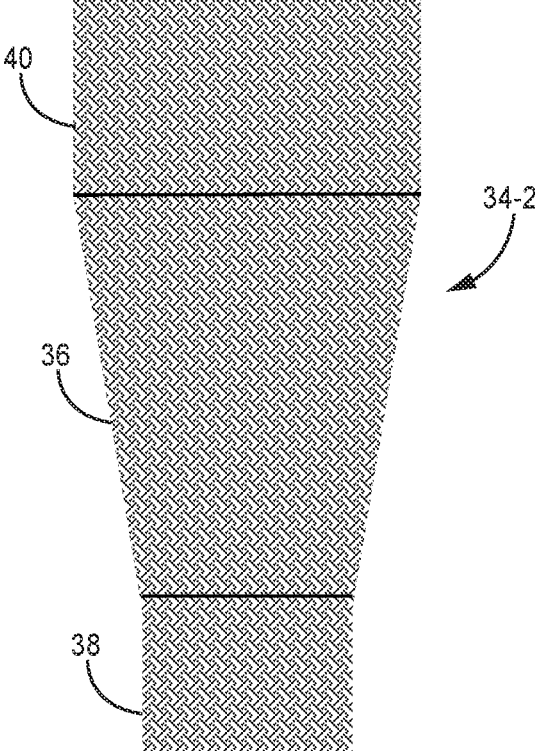
FIG. 4 is a simplified illustration of one preform segment cut from the braided article of FIG. 3.

FIG. 4 is a simplified illustration of preform segment 34-2 rotated counterclockwise 90 degrees from the orientation of FIG. 3. With continued reference to FIG. 3, preform segment 34-2 can be formed into an airfoil-containing part, such as a vane for a gas turbine engine. Braided fabric from the underlying mandrel (i.e., 12-2) becomes airfoil portion 36, braided fabric from the underlying transition pieces (i.e., 14-1 and 14-2) becomes inner diameter (ID) platform portion 38 and outer diameter (OD) platform portion 40, respectively. Additional ceramic fabric (e.g., plies, space-filling inserts, etc.) can be combined with preform segment 34-2 as necessary to fabricate a vane preform. Arranging mandrels 12 in the repeating tapering-to-widening manner, as discussed above with respect to FIG. 1, and the use of the appropriately sized intervening transition pieces 14 prevents sharp/abrupt dimensional transitions along mandrel assembly 10. Such abrupt transitions can be difficult to braid and can lead to defects in the resulting preform segments 34.

Figure 5:
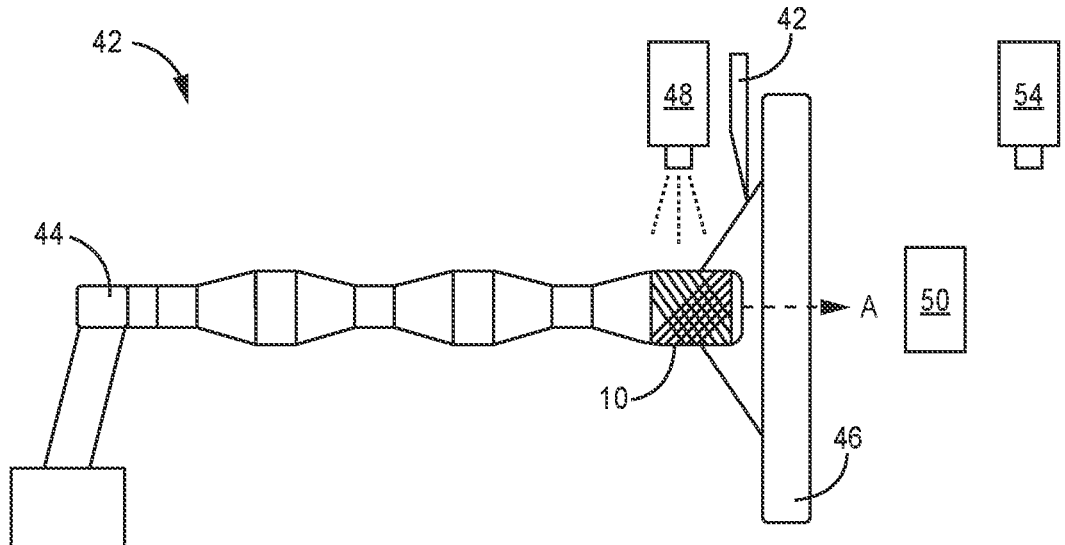
FIG. 5 is a schematic illustration of an automated braiding system incorporating the multi-mandrel assembly of FIG. 1.

FIG. 5 is a simplified illustration of automated braiding system 42 incorporating mandrel assembly 10. System 42 can include robotic arm 44, mandrel assembly 10, radial braider 46, applicator 48, debulking tool 50, cutting device 52, and optical device 54. Mandrel assembly 10 can be removably connected to robotic arm 44, which can rotate mandrel assembly 10 about axis A, and translate generally in three dimensions. Applicator 48 can be used to apply a polymer binder to the ceramic fabric, debulking tool 50 can debulk the ceramic fabric, and cutting device 52 can cut braided article 30 (FIG. 3) into individual preform segments, without the need to transfer braided article 30 to another location. Optical device 54 can be used to inspect braided layer(s) 32 for defects in the braid pattern, braid angle, thickness, etc.

It should be understood that the disclosed mandrel assembly can include any number of mandrels (e.g., 12-1, 12-2, . . . 12-n) of various geometries (disparate or uniform) with any necessary transition pieces. For a mandrel assembly with an even number (e.g., four) mandrels, the lead-in and end extensions can have the same uniform dimensions (e.g., D1), depending on the orientation of the individual mandrels. In general, the mandrel assembly is constrained to an overall length (i.e., along axis A) that can be supported by the braiding apparatus. Such a length could be up to five feet (1.52 m) depending on the weight of mandrel assembly 10, and could include tens of mandrels for fabricating as many parts from one braiding process.

The disclosed mandrel assembly can be used to form features in CMC components for use in aerospace, maritime, or industrial equipment, to name a few, non-limiting examples.

DISCUSSION OF POSSIBLE EMBODIMENTS

The following are non-exclusive descriptions of possible embodiments of the present invention.

A system for forming multiple braided preform segments includes a mandrel assembly disposed along a mandrel axis, a radial braider for winding fibers onto the mandrel assembly to form a continuous braided article, an applicator for applying a polymer binder to the braided article while mounted on the mandrel assembly, and a debulking tool for debulking the braided article while mounted on the mandrel assembly. The mandrel assembly includes a lead-in extension defining a first end, an end extension defining a second end, and a plurality of mandrels removably connected to a plurality of transition pieces and disposed axially between the lead-in extension and the end extension.

The system of the preceding paragraph can optionally include, additionally and/or alternatively, any one or more of the following features, configurations and/or additional components:

In the above system, a first mandrel of the plurality of mandrels can be removably connected to the lead-in extension, a first transition piece of the plurality of transition pieces can be removably connected to the first mandrel opposite the lead-in extension, and a second mandrel of the plurality of mandrels can be removably connected to the first transition piece opposite the first mandrel.

In any of the above systems, the first mandrel can be disposed such that it tapers from the lead-in extension to the first transition piece, and the second mandrel can be disposed such that it widens from the first transition piece toward the end extension.

In any of the above systems, the lead-in extension can have a uniform first dimension, and wherein the first transition piece can have a uniform second dimension, the second dimension being less than the first dimension.

In any of the above systems, the first mandrel can taper from the first dimension to the second dimension, and the second mandrel can widen from the second dimension to the first dimension.

In any of the above systems, each of a first subset of the plurality of transition pieces can have the uniform first dimension, and each of a second subset of the plurality of transition pieces can have the uniform second dimension.

In any of the above systems, the first mandrel can be disposed such that it widens from the lead-in extension to the first transition piece, and the second mandrel can be disposed such that it tapers from the first transition piece toward the end extension.

In any of the above systems, the plurality of mandrels can be formed from at least one of graphite, a metallic material, and plastic.

In any of the above systems, the plurality of transition pieces can be formed from at least one of graphite, a metallic material, and plastic.

In any of the above systems, the plurality of mandrels can include five mandrels.

Any of the above systems can further include a robotic arm from translating and rotating the mandrel assembly.

Any of the above systems can further include a cutting device for cutting the braided article into a plurality of preform segments.

Any of the above systems can further include an optical device for inspecting the braided article.

A method of forming multiple CMC parts from a braided article includes assembling a mandrel assembly, the mandrel assembly including a lead-in extension, an end extension, and a plurality of mandrels removably connected to a plurality of transition pieces and disposed axially between the lead-in extension and the end extension. The method further includes incorporating the mandrel assembly into a braiding system, forming a continuous braided article over the plurality of mandrels and the plurality of transition pieces, cutting the braided article into a plurality of preform segments, forming a corresponding plurality of preforms from the plurality of preform segments, densifying the plurality of preforms with a ceramic matrix.

The system of the preceding paragraph can optionally include, additionally and/or alternatively, any one or more of the following features, configurations and/or additional steps:

In the above method, assembling the mandrel assembly can include removably connecting a first mandrel of the plurality of mandrels to the lead-in extension, removably connecting a first transition piece of the plurality of transition pieces to the first mandrel opposite the lead-in extension, and removably connecting a second mandrel of the plurality of mandrels to the first transition piece opposite the first mandrel.

In any of the above methods, assembling the mandrel assembly can further include disposing the first mandrel such that it tapers from the lead-in extension to the first transition piece, and disposing the second mandrel such that it widens from the first transition piece toward the end extension.

In any of the above methods, assembling the mandrel assembly can further include disposing the first mandrel such that it widens from the lead-in extension to the first transition piece, and disposing the second mandrel such that it tapers from the first transition piece toward the end extension.

In any of the above methods, cutting the braided article can include cutting along an axial midpoint of each of the plurality of transition pieces.

In any of the above methods, the plurality of preform segments can include five preform segments.

In any of the above methods, the plurality of preforms can be densified using chemical vapor infiltration.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A system for forming multiple braided preform segments, the system comprising:

a mandrel assembly disposed along a mandrel axis, the mandrel assembly comprising:

a lead-in extension defining a first terminal end;

an end extension defining a second terminal end; and a plurality of mandrels removably connected to a plurality of transition pieces and disposed axially between the lead-in extension and the end extension, wherein:

each of the plurality of mandrels extends and tapers between two axial ends; and each of the transition pieces abuts and separates two of the plurality of mandrels and has a lateral dimension transverse to the mandrel axis, shared by abutting axial ends of both of the abutting two of the plurality of mandrels, and uniform throughout an entire axial extend of the respective transition piece between the abutting two mandrels;

a radial braider for winding fibers onto the mandrel assembly to form a continuous braided article; and an applicator for applying a polymer binder to the braided article while mounted on the mandrel assembly.

2. The system of claim 1, wherein:

a first mandrel of the plurality of mandrels is removably connected to the lead-in extension;

a first transition piece of the plurality of transition pieces is removably connected to the first mandrel opposite the lead-in extension; and a second mandrel of the plurality of mandrels is removably connected to the first transition piece opposite the first mandrel;

wherein the axially uniform dimension of the first transition piece is a first axially uniform dimension.

3. The system of claim 2, wherein:

the first mandrel is disposed such that it tapers from the lead-in extension to the first transition piece; and the second mandrel is disposed such that it widens from the first transition piece toward the end extension.

4. The system of claim 3, wherein the lead-in extension has a second axially uniform dimension greater than the first axially uniform dimension of the first transition piece.

5. The system of claim 4, wherein the first mandrel tapers from the second axially uniform dimension to the first axially uniform dimension shared with the first transition piece, and wherein the second mandrel widens from the first axially uniform dimension shared with the first transition piece to the second axially uniform dimension.

6. The system of claim 4, wherein each of a first subset of the plurality of transition pieces has the first axially uniform dimension, and wherein each of a second subset of the plurality of transition pieces has the second axially uniform dimension.

7. The system of claim 2, wherein:

the first mandrel is disposed such that it widens from the lead-in extension to the first transition piece; and the second mandrel is disposed such that it tapers from the first transition piece toward the end extension.

8. The system of claim 1, wherein the plurality of mandrels are formed from at least one of graphite, a metallic material, and plastic.

9. The system of claim 1, wherein the plurality of transition pieces are formed from at least one of graphite, a metallic material, and plastic.

10. The system of claim 1, wherein the plurality of mandrels comprises five mandrels.

11. The system of claim 1 and further comprising: a robotic arm for translating and rotating the mandrel assembly.

12. The system of claim 1 and further comprising: a cutting device for cutting the braided article into a plurality of preform segments.

13. The system of claim 1 and further comprising: an optical device for inspecting the braided article.

14. The system of claim 1, wherein each of the plurality of mandrels comprises a plurality of pins or a plurality of slots and each of the plurality of transition portions comprises the other of the plurality of pins and the plurality of slots, the plurality of slots and the plurality of pins configured to mate to connect the plurality of mandrels to the plurality of transition portions.

15. A method of forming multiple CMC parts from a braided article, the method comprising:

assembling a mandrel assembly, the mandrel assembly comprising:

a lead-in extension;

an end extension; and a plurality of mandrels removably connected to a plurality of transition pieces and disposed axially between the lead-in extension and the end extension, wherein:

each of the plurality of mandrels extends and tapers between two axial ends; and each of the transition pieces abuts and separates two of the plurality of mandrels and has a lateral dimension transverse to the mandrel axis, shared by abutting axial ends of both of the abutting two of the plurality of mandrels, and uniform throughout an entire axial extend of the respective transition piece between the abutting two mandrels;

incorporating the mandrel assembly into a braiding system;

forming a continuous braided article over the plurality of mandrels and the plurality of transition pieces;

cutting the braided article into a plurality of preform segments;

forming a corresponding plurality of preforms from the plurality of preform segments; and densifying the plurality of preforms with a ceramic matrix.

16. The method of claim 15, wherein assembling the mandrel assembly comprises:

removably connecting a first mandrel of the plurality of mandrels to the lead-in extension;

removably connecting a first transition piece of the plurality of transition pieces to the first mandrel opposite the lead-in extension; and removably connecting a second mandrel of the plurality of mandrels to the first transition piece opposite the first mandrel.

17. The method of claim 16, wherein assembling the mandrel assembly further comprises:

disposing the first mandrel such that it tapers from the lead-in extension to the first transition piece;

disposing the second mandrel such that it widens from the first transition piece toward the end extension; or, disposing the first mandrel such that it widens from the lead-in extension to the first transition piece; and disposing the second mandrel such that it tapers from the first transition piece toward the end extension.

18. The method of claim 15, wherein cutting the braided article comprises cutting along an axial midpoint of each of the plurality of transition pieces.

19. The method of claim 18, wherein the plurality of preform segments comprises five preform segments.

20. The method of claim 15, wherein the plurality of preforms are densified using chemical vapor infiltration.

* * * * *